(12) United States Patent
Lin et al.

(10) Patent No.: US 12,423,019 B2
(45) Date of Patent: Sep. 23, 2025

(54) READ GATE TRAINING AND TRACKING

(71) Applicants: Advanced Micro Devices, Inc, Santa Clara, CA (US); ATI Technologies ULC, Markham (CA)

(72) Inventors: David Da Wei Lin, Westborough, MA (US); Ronald Lee Pettyjohn, Concord, MA (US); Pouya Najafi Ashtiani, Toronto (CA); Gershom Birk, Coquitlam (CA); Anwar Parvez Kashem, Sudbury, MA (US)

(73) Assignees: Advanced Micro Devices, Inc, Santa Clara, CA (US); ATI Technologies ULC, Markham (CA)

( * ) Notice: Subject to any disclaimer, the term of this patent is extended or adjusted under 35 U.S.C. 154(b) by 188 days.

(21) Appl. No.: 18/342,186

(22) Filed: Jun. 27, 2023

(65) Prior Publication Data
US 2025/0004662 A1    Jan. 2, 2025

(51) Int. Cl.
*G06F 3/00* (2006.01)
*G06F 3/06* (2006.01)

(52) U.S. Cl.
CPC .......... *G06F 3/0655* (2013.01); *G06F 3/0604* (2013.01); *G06F 3/0673* (2013.01)

(58) Field of Classification Search
CPC ......... G11C 29/52; G11C 7/1072; G11C 5/04; G11C 11/4076; G11C 11/4093; G11C 7/1066; G11C 7/1093; G11C 16/10; G11C 16/26; G11C 7/22; G11C 29/026; G11C 29/028; G11C 7/00; G06F 17/16; G06F 2009/45583; G06F 2213/0026; G06F 8/41; G06F 9/3001; G06F 9/30014; G06F 9/30036; G06F 9/30038; G06F 9/3004; G06F 9/30047; G06F 9/30076; G06F 9/30087; G06F 9/3009; G06F 9/3017; G06F 9/30181; G06F 9/30189; G06F 9/383; G06F 9/3834; G06F 9/3836; G06F 9/3842; G06F 9/3851; G06F 9/3854; G06F 9/3858; G06F 9/38585; G06F 9/3863; G06F 9/3877; G06F 9/3887; G06F 9/3888; G06F 9/4411; G06F 9/45504; G06F 9/45558; G06F 9/48; G06F 9/4881; G06F 9/5027; G06F 1/04; G06F 1/10; G06F 1/12
See application file for complete search history.

(56) References Cited

U.S. PATENT DOCUMENTS 10,067,718 B2 * 9/2018 Covington ............ G06F 3/0659

* cited by examiner

*Primary Examiner* — Thong Q Le
(74) *Attorney, Agent, or Firm* — FIG. 1 Patents (57) ABSTRACT

In accordance with described techniques for read gate training and tracking, a computing device includes a memory system (e.g., dynamic random access memory (DRAM)) that receives a memory read operation which includes a memory clock that correlates to a physical layer (PHY) clock. The computing device includes a PHY that receives a return data signal from the memory system, where the return data signal includes a returned data strobe that is out-of-phase with respect to the PHY clock. The computing device includes training logic that utilizes edge detection to determine an unknown clocking phase of the returned data strobe with respect to the PHY clock. The computing device also includes tracking logic that utilizes the edge detection to detect a signal drift of the delay signal with respect to the returned data strobe and compensate for the drift.

20 Claims, 9 Drawing Sheets

READ GATE TRAINING AND TRACKING

BACKGROUND

The physical memory, such as dynamic random access memory and associated memory controllers, utilized in computing systems to manage data storage, as well as how this data is made available to processing devices (e.g., a central processing unit, graphics processing unit, auxiliary processing unit, parallel accelerated processor, and so forth). As such, efficiency in data storage and access to data directly affects the operation of these devices, examples of which include processing speed, bandwidth, and power consumption. Conventional techniques for memory operations introduce latency, thereby hindering performance of the memory operations as well as device operations that rely on data that is a subject of the memory operations.

BRIEF DESCRIPTION OF THE DRAWINGS

The detailed description is described with reference to the accompanying figures.

DETAILED DESCRIPTION

Efficiency of data access to and from device memory has a direct effect on efficiency of overall device operation. The data stored by a computing device in a physical memory (e.g., a dynamic random access memory (DRAM)) is subject to operation instructions communicated from a memory controller, such as for read and write memory operations. The memory controller and physical memory are communicatively coupled to a physical layer (PHY) of the device (also referred to as the PHY layer, or PHY logic). The physical layer causes the physical memory to push data subject to a memory read operation received from the memory controller to a first-in, first-out (FIFO) buffer, and the data is then output from the buffer back to the memory controller. The PHY communicatively couples the memory controller with the physical memory, and includes the FIFO buffer as a read data buffer that supports memory read operations and data communication between the physical memory and the memory controller.

In device implementation, the PHY receives a memory read operation initiated by the memory controller. The PHY signals the memory read operation to the physical memory as a read command signal and a memory clock, where the memory clock correlates to the current timing of a PHY clock. In response to the memory read operation, the PHY receives a return data signal (DQs) from the memory system, and the return data signal includes a returned data strobe (DQS). However, the PHY receives the returned data strobe which is out-of-phase with respect to the PHY clock (e.g., the returned data strobe may be delayed by several nanoseconds), such as due to a timing latency that has been introduced in returning the requested data and/or due to latency caused by the physical signal communication path. This unknown data strobe latency needs to be accounted for before any memory read transaction.

To solve the latency and phase relationship of the returned data strobe with respect to the PHY clock, aspects of the described techniques support implementations of read gate training and tracking. In one or more implementations, a read gate logic system in the PHY includes training logic and tracking logic utilized in conjunction to determine and compensate for unknown data strobe latency and phase. The training logic generates a pulse width filter signal to filter a high impedance state of the returned data strobe, which is returned from the physical memory in an unknown phase with respect to the PHY clock. This involves the training logic utilizing a phase detectors circuit and an adjustable delay line, and subsequently generating a timing mask as a delay signal to filter the high impedance state of the returned data strobe. Additionally, the tracking logic utilizes the phase detectors circuit to detect possible drift of the timing mask relative to the data strobe and further adjusts the delay line to compensate for the drift.

In device circuit implementations, the circuits are typically subject to power, voltage, and/or temperature (PVT) variation that affects signal timing and overall memory system operation performance. In aspects of this disclosure for read gate training and tracking, the tracking logic is implemented to detect the drift of the timing mask with respect to an incoming data strobe due to variations, and compensate for it by incrementing or decrementing the delay line. Accordingly, the unknown clocking phase of a returned data strobe from the physical memory is determined (e.g., by the training logic), and the determined strobe phase is maintained by monitoring and compensating for signal drift (e.g., by the tracking logic), which is a result of variation over time.

In aspects of the described techniques, read gate logic is implemented in PHY as hardware and/or software logic, such as a software implementation that initiates and controls the training logic and the tracking logic of the read gate logic. Notably, aspects of the described read gate training and tracking can be utilized with any type of CPU, APU, GPU, and/or FPGA hardware in a processing and memory system. In further aspects of the described read gate training and tracking, the tracking logic is initiated during return data signals to track the signal drift of a determined timing mask relative to the data strobe, and the training logic is also initiated during the return data signals that are communicated back from the memory system to determine the timing mask that filters the high impedance state of the returned data strobe with respect to the PHY clock. Accordingly, operational performance of the memory operations between the PHY and the physical memory is maintained by both training and the tracking logic being initiated during a return data signal communicated from the memory system.

Various aspects of the described read gate training and tracking provides a solution for memory initialization and operations so that the PHY and/or memory controller trains incoming data signals and data strobe (DQS) timing with respect to its own internal clocking, such that PHY can properly utilize the valid strobes to sample the data (DQs) and filter out a high impedance (Hi-Z) state on the line. In implementations, the training logic and the tracking logic of the PHY read gate logic utilize edge detection techniques along with cycle and sub-cycle base adjustment, to determine the assertion of DQS valid window (tDV). An intended position is at the preamble low region with a +/−2UI valid window margin (VWM) to accommodate DRAMs versus PHY timing drift due to, in particular, voltage and timing (VT) variations. In further aspects of the described techniques, the delay line is configurable to determine the assertion time of DQS valid window to filter the high impedance state, and this valid window is self-closing. The self-closing aspect is provided by having a FIFO read pointer clocked by incoming DQS to determine the de-assertion of the DQS valid window, where the clocking by the incoming DQS is subject to the drift from a DRAM is tracked accordingly. A FIFO buffer provides the programming capability to determine the number of DQS cycles need to be passed through.

In some aspects, the techniques described herein relate to a computing device comprising a memory system to receive a memory read operation that includes a memory clock which correlates to a physical layer (PHY) clock, a PHY to receive a return data signal from the memory system, the return data signal including a returned data strobe that is out-of-phase with respect to the PHY clock, and training logic configured to utilize edge detection and delay adjustment to determine an unknown clocking phase of the returned data strobe with respect to the PHY clock.

In some aspects, the techniques described herein relate to a computing device further comprising a phase detectors circuit including a first phase detector and a second phase detector implementing the edge detection.

In some aspects, the techniques described herein relate to a computing device where the training logic generates a pulse width filter signal to filter a high impedance state of the returned data strobe with respect to the PHY clock.

In some aspects, the techniques described herein relate to a computing device where the training logic determines a timing mask as a delay signal to filter a high impedance state of the returned data strobe with respect to the PHY clock.

In some aspects, the techniques described herein relate to a computing device where the delay signal is configurable with extended pulses to filter the high impedance state, and the delay signal is self-closing.

In some aspects, the techniques described herein relate to a computing device further comprising tracking logic configured to utilize the edge detection to detect a signal drift of the delay signal with respect to the returned data strobe.

In some aspects, the techniques described herein relate to a computing device where the tracking logic is configured to detect an advancing signal drift of the delay signal with respect to the returned data strobe, and the tracking logic is configured to decrement the delay signal.

In some aspects, the techniques described herein relate to a computing device where the tracking logic is configured to detect a lagging signal drift of the delay signal with respect to the returned data strobe, and the tracking logic is configured to increment the delay signal.

In some aspects, the techniques described herein relate to a computing device where the tracking logic is initiated during the return data signal being communicated to the memory system to track the signal drift of the delay signal with respect to the returned data strobe, and the training logic is initiated during the return data signal being communicated from the memory system to determine the timing mask that filters the high impedance state of the returned data strobe with respect to the PHY clock.

In some aspects, the techniques described herein relate to a computing device where operational performance of memory operations between the PHY and the memory system is maintained by the tracking logic and the training logic being initiated during the return data signal communicated from the memory system.

In some aspects, the techniques described herein relate to a device physical layer (PHY) comprising a PHY clock signaled as a memory clock to dynamic random access memory (DRAM) as part of a memory read operation, a returned data strobe signaled to the device PHY as a part of a return data signal from the DRAM, the returned data strobe being out-of-phase with respect to the PHY clock, and training logic configured to determine an unknown clocking phase of the returned data strobe with respect to the PHY clock.

In some aspects, the techniques described herein relate to a device PHY where the training logic generates a pulse width filter signal to filter a high impedance state of the returned data strobe with respect to the PHY clock.

In some aspects, the techniques described herein relate to a device PHY where the training logic determines a timing mask as a delay signal to filter a high impedance state of the returned data strobe with respect to the PHY clock.

In some aspects, the techniques described herein relate to a device PHY further comprising tracking logic configured to one of detect an advancing signal drift of the delay signal with respect to the returned data strobe, and the tracking logic is responsive to decrement the delay signal, or detect a lagging signal drift of the delay signal with respect to the returned data strobe, and the tracking logic is responsive to increment the delay signal.

In some aspects, the techniques described herein relate to a method of receiving, by a dynamic random access memory (DRAM), a memory read operation that includes a memory clock which correlates to a physical layer (PHY) clock, receiving by a PHY, a return data signal from the DRAM, the return data signal including a returned data strobe that is out-of-phase with respect to the PHY clock, and determining an unknown clocking phase of the returned data strobe with respect to the PHY clock.

In some aspects, the techniques described herein relate to a method further comprising generating a pulse width filter signal to filter a high impedance state of the returned data strobe with respect to the PHY clock.

In some aspects, the techniques described herein relate to a method further comprising determining a timing mask as a delay signal to filter a high impedance state of the returned data strobe with respect to the PHY clock.

In some aspects, the techniques described herein relate to a method further comprising utilizing edge detection to detect a signal drift of the delay signal with respect to the returned data strobe.

In some aspects, the techniques described herein relate to a method further comprising detecting an advancing signal drift of the delay signal with respect to the returned data strobe, and decrementing the delay signal.

In some aspects, the techniques described herein relate to a method further comprising detecting a lagging signal drift of the delay signal with respect to the returned data strobe, and incrementing the delay signal.

Figure 1:
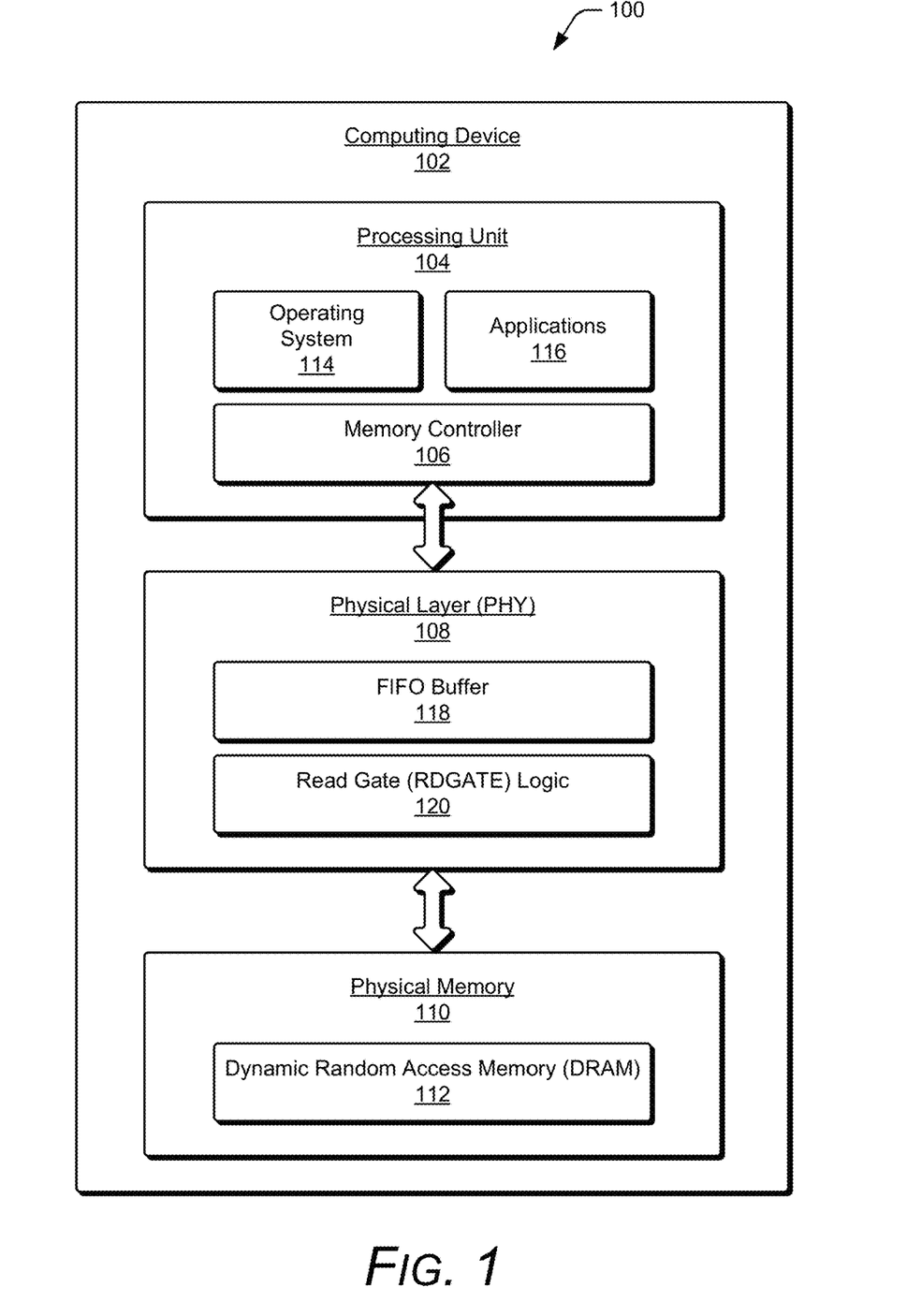
FIG. 1 is a block diagram of a non-limiting example system for read gate training and tracking, as described herein.

FIG. 1 is a block diagram of a non-limiting example system 100 for read gate training and tracking, as described herein. The example system 100 is illustrative of any type of a computing system or computing device 102 that includes a processing unit 104 with a memory controller 106, a physical layer (PHY) 108, and a physical memory 110 (e.g., volatile or nonvolatile memory) that are communicatively coupled, one to another. As referred to herein, the physical memory 110 is a memory system, and an example of the physical memory 110 is dynamic random access memory (DRAM) 112. The computing device 102 is an example of any type computing and/or electronic device, to include without limitation, a computer, computing device, server device, mobile device (e.g., a wearable, mobile phone, tablet device, laptop), processors (e.g., graphics processing units, central processing units, and accelerators), a digital signal processor, disk array controller, hard disk drive host adapter, memory card, solid-state drive, wireless communications hardware connection, Ethernet hardware connection, a switch, a bridge, network interface controller, and/or any other type apparatus configuration. Further the computing device 102 is configurable as part of another device that incorporates this computational functionality (e.g., a vehicle).

In this example system 100, the processing unit 104 executes software (e.g., an operating system 114, applications 116, etc.) to issue memory operations to the memory controller 106. The memory operations are configurable to cause storage (e.g., data programming) of data to the physical memory 110 as a write operation or to read data from the physical memory 110 as a read operation. In device implementations, the computing device 102 includes a memory system, such as the physical memory 110 (e.g., DRAM 112).

The memory controller 106 is communicatively coupled to the PHY 108 and performs operations based on a reference clock signal utilized by the processing unit 104 to coordinate the operations. The memory controller 106 initiates memory operation instructions to the physical memory 110 via the PHY 108. The processing unit 104 processes and initiates the memory operation instructions for any type of software, application, procedure, device function, device component, and/or system module that initiates memory operation instructions, such as read and write memory operations. Further, the physical memory 110 is communicatively coupled to the PHY 108, which operates based on a different clock signal than the reference clock signal utilized by the processing unit 104. In device implementation, the PHY clock has a higher clock rate than the reference clock signal utilized by the processing unit 104.

The PHY 108 supports communication between the memory controller 106 and the physical memory 110. The PHY 108 includes a FIFO buffer 118, which is utilized as a "read buffer" to store data obtained from the physical memory 110 in response to a memory read operation and output the data to the memory controller 106. For example, the PHY 108 receives a memory operation (e.g., a memory read operation) from the memory controller 106, and this operation is then communicated by the PHY 108 to the physical memory 110. This causes the physical memory 110 to push data subject to the memory read operation to the FIFO buffer 118, and the data is then output by the FIFO buffer 118 to the memory controller 106.

In this example system 100, the PHY 108 includes read gate (e.g., RDGATE) logic 120, which is implemented as hardware and/or software logic, such as a software implementation that initiates and controls training logic and tracking logic of the read gate logic 120. Implementation examples of the read gate logic 120 are further shown and described with reference to FIG. 2, as well as a read gate training and tracking circuit diagram shown and described with reference to FIG. 6, and a circuit diagram for phase detectors logic shown and described with reference to FIG. 7. In implementations, the read gate logic 120 is hardware logic added to the PHY 108. Although illustrated as a component or module of the PHY 108, the read gate logic 120 is implementable as an independent component or logic, separate from the PHY layer in the computing device 102. In one or more implementations, the read gate logic 120 is a programmable state machine. Alternatively, or in addition, the read gate logic 120 includes independent processing, memory, and/or logic components functioning as a computing and/or electronic device integrated with the PHY 108, or with the computing device 102. The read gate logic 120 is implementable in software, in hardware, or as a combination of software and hardware components.

In device implementation, the PHY 108 receives a memory read operation initiated by the memory controller 106. The PHY signals the memory read operation to the physical memory 110 as a read command and a memory clock, where the memory clock correlates to the current timing of a PHY clock. In response to the memory read operation, the PHY 108 receives a return data signal from the memory system, and the return data signal includes a returned data strobe. However, the PHY 108 receives the returned data strobe which is now out-of-phase with respect to the PHY clock (e.g., the returned data strobe may be delayed by several nano-seconds), such as due to a timing latency that has been introduced in returning the requested data and due to latency caused by the physical signal communication path.

In aspects of the techniques for read gate training and tracking, as described herein, and to solve this memory clock latency problem, the read gate logic 120 in the PHY 108 includes training logic and tracking logic utilized in conjunction to determine and compensate for unknown memory clock latencies. The training logic generates a pulse width filter signal to filter the high impedance state of the returned data strobe, which is returned from the physical memory 110 out-of-phase with respect to the PHY clock. This involves the training logic utilizing phase detectors with a delay line to determine a timing mask as a delay signal to filter the high impedance state of the returned data strobe with respect to the PHY clock. Additionally, the tracking logic utilizes a phase detectors circuit for signal edge detection to detect possible signal drift of the delay signal with respect to the returned data strobe and adjust the delay signal to compensate for the drift.

Various aspects of the described read gate training and tracking provides a solution for memory initialization so that the PHY 108 and/or the memory controller 106 trains incoming data signals and data strobe (DQS) timing with respect to its own internal clocking, such that PHY 108 can properly utilize the valid strobes to sample the data (DQs) and filter out high impedance (Hi-Z) state signals on the line. In implementations, the training logic and the tracking logic of the PHY read gate logic 120 are edge detection techniques that are utilized, along with cycle and sub-cycle base adjustment, to determine the assertion of DQS (data output) valid window (tDV). An intended position is at the preamble low region with a +/−2UI valid window margin (VWM) to accommodate DRAMs versus PHY timing drift due to, in particular, voltage and timing (VT) variations.

Figure 2:
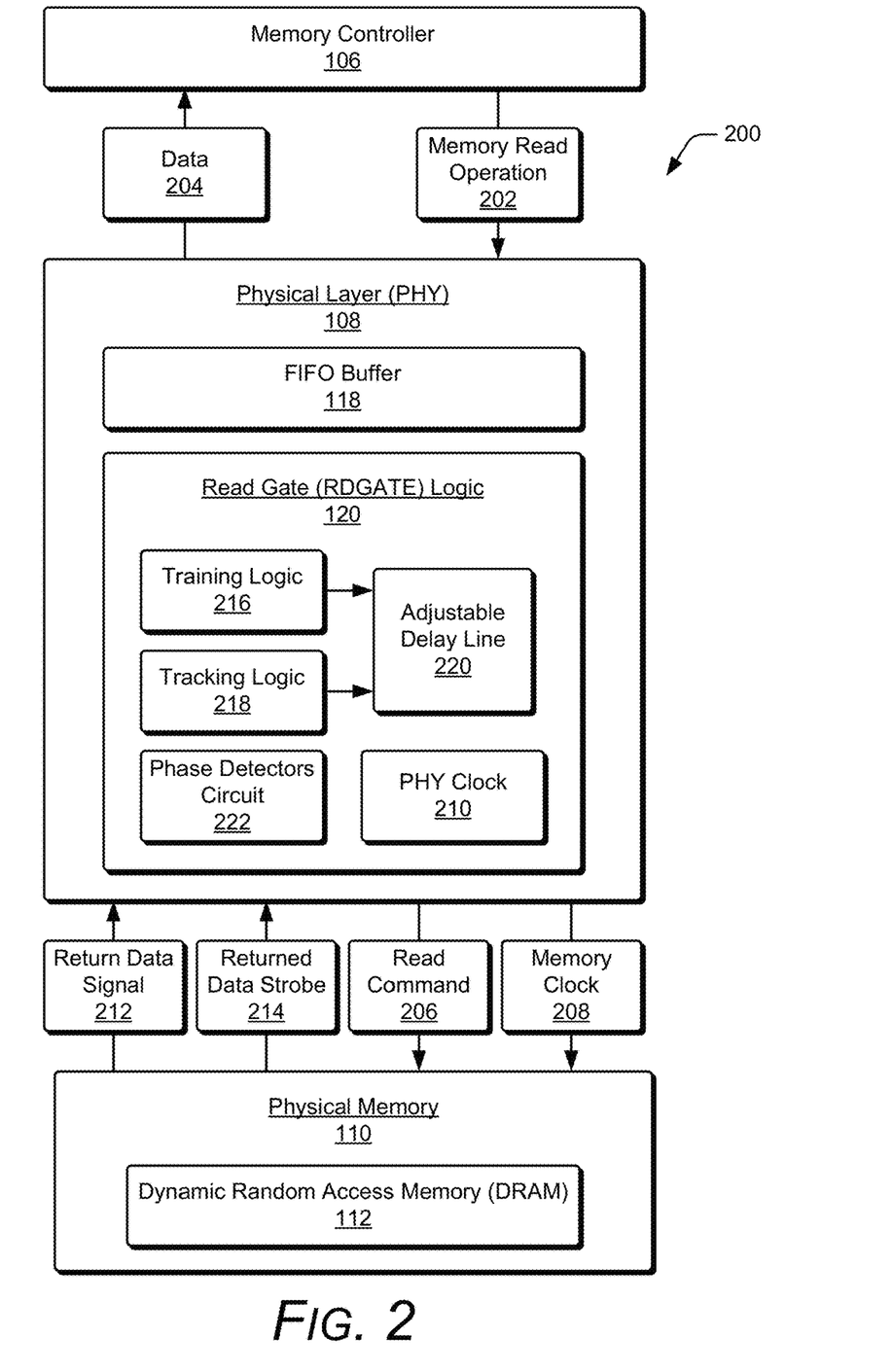
FIG. 2 depicts non-limiting example of a system with read gate logic for operation of read gate training and tracking, as described herein.

FIG. 2 depicts a non-limiting example of a system 200 with read gate logic for operation of read gate training and tracking, as described herein. This example system 200 further illustrates and describes aspects of the memory controller 106, the PHY 108, and the physical memory 110 (e.g., a memory system of the computing device 102) as shown and described with reference to FIG. 1. The PHY 108 in this example receives a memory read operation 202 from the memory controller 106, and the memory controller will also receive data 204 from the physical memory 110 via the PHY 108 responsive to the memory read operation 202.

The PHY 108 generates a read command 206 specifying the memory read operation 202, indicating addresses of corresponding data that is a subject of the memory read operation. The PHY 108 signals the memory read operation 202 to the physical memory 110 as the read command 206 and a memory clock 208, where the memory clock 208 correlates to the current timing of a PHY clock 210 of the PHY 108. In response to the memory read operation 202, the PHY 108 receives a return data signal 212 from the physical memory 110, and the return data signal includes a returned data strobe 214. The returned data strobe 214 is like a clock signal for the data lines in which each data byte is associated with a corresponding data strobe. The read command 206 is driven by the PHY 108 to the physical memory 110, and the return data signal 212 and the associated returned data strobe 214 are returned from the physical memory 110 to the FIFO buffer 118 of the PHY 108 in response to the read command 206, which is then output as the data 204 to the memory controller 106.

In device implementations, the PHY 108 receives the return data signal 212 and the returned data strobe 214. However, the PHY 108 receives the returned data strobe 214 which is now out-of-phase with respect to the PHY clock 210 (e.g., the returned data strobe 214 may be delayed by several nano-seconds), such as due to a timing latency that has been introduced in returning the requested data and due to latency caused by the physical signal communication path. In one or more implementations, the read gate logic 120 in the PHY 108 includes the training logic 216 and the tracking logic 218 that is utilized in conjunction to determine and compensate for unknown read clock latencies (e.g., the returned data strobe 214 that is out-of-phase with respect to the PHY clock 210).

In aspects of the described techniques for read gate training and tracking, the training logic 216 generates a pulse width filter signal to filter a high impedance state of the returned data strobe 214, which is returned from the physical memory 110 out-of-phase with respect to the PHY clock 210. This involves the training logic 216 adjusting an adjustable delay line 220 and generating a timing mask as a delay signal to filter the high impedance state of the returned data strobe 214 with respect to the PHY clock 210. Additionally, the tracking logic 218 utilizes a phase detectors circuit 222 for signal edge detection to detect possible signal drift of the delay signal with respect to the returned data strobe and adjusts the adjustable delay line 220 to compensate for the drift. This is performable over iterations to dynamically determine and compensate for unknown memory clock latencies, and is responsive to changes in device circuit operation, such as voltage and/or temperature (VT) variances that affect signal timing and overall memory system operation performance.

Figure 3:
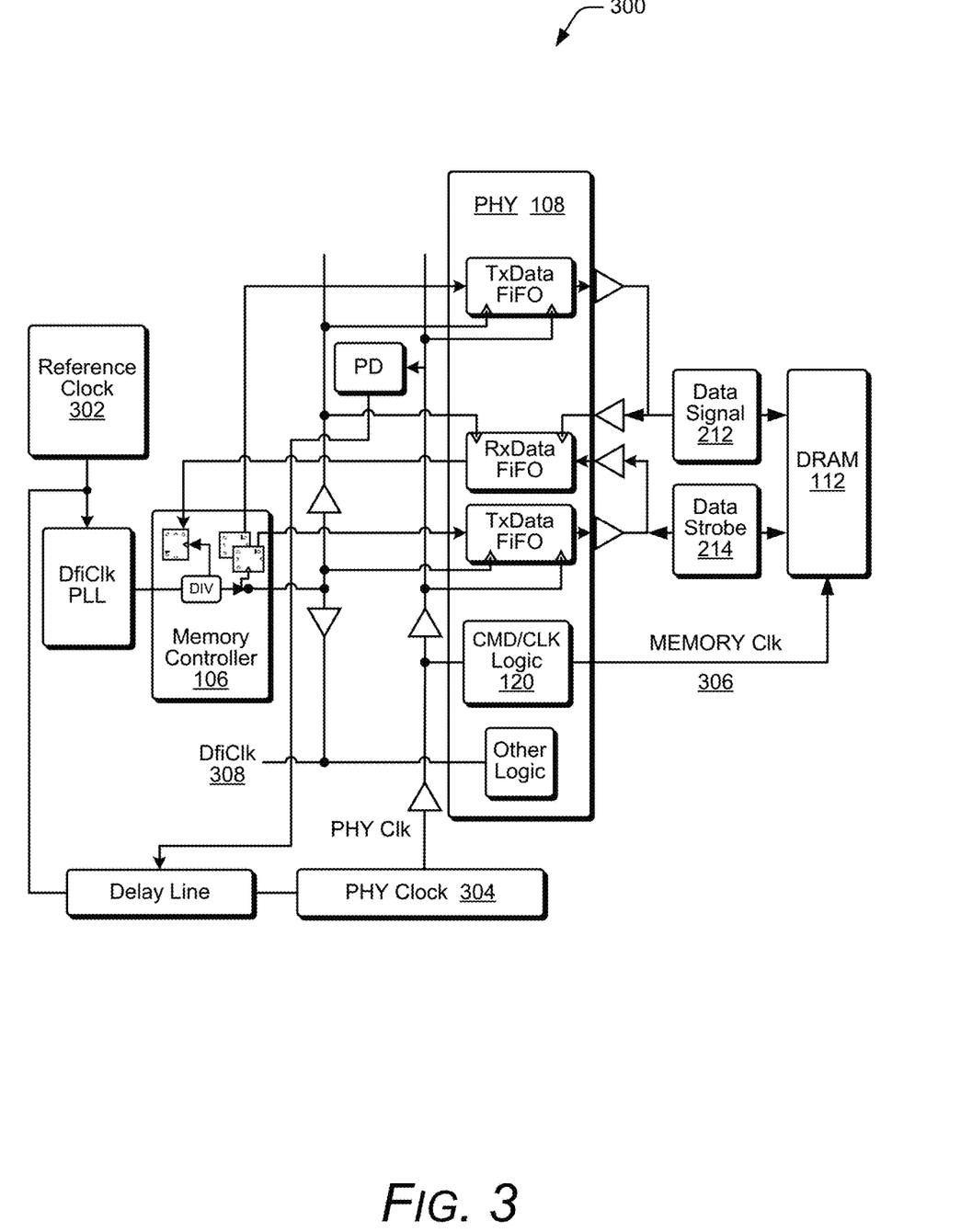
FIG. 3 depicts a non-limiting example of a circuit diagram as related to read gate training and tracking, as described herein.

FIG. 3 depicts a non-limiting example of a circuit diagram 300 as related to read gate training and tracking, as described herein. This example circuit diagram 300 further illustrates and describes aspects of the memory controller 106, the PHY 108, the read gate (RDGATE) logic 120, and the memory system (e.g., the DRAM 112) as shown and described with reference to FIGS. 1 and 2. The system includes a reference clock 302 outputting a reference clock signal to the memory controller 106 (e.g., directly or indirectly through use of a phase-locked loop). The memory controller 106 then operates and communicates with the physical layer 108 based on timing of the reference clock 302. A memory clock 304 is also utilized in this example to set a clock rate for PHY 108 operations. As described above, the PHY 108 signals a memory read operation to the memory system as the read command 206 and the memory clock 208 (e.g., READ Clk at 306 is MEMCLK (memory clock 304)), which correlates to the current timing of the PHY clock (e.g., DfiClk 308) of the PHY 108. In response to the memory read operation, the PHY 108 receives a return data signal 212 from the memory system, and the return data signal includes a returned data strobe 214 (e.g., data strobe, DQS).

Figure 4:
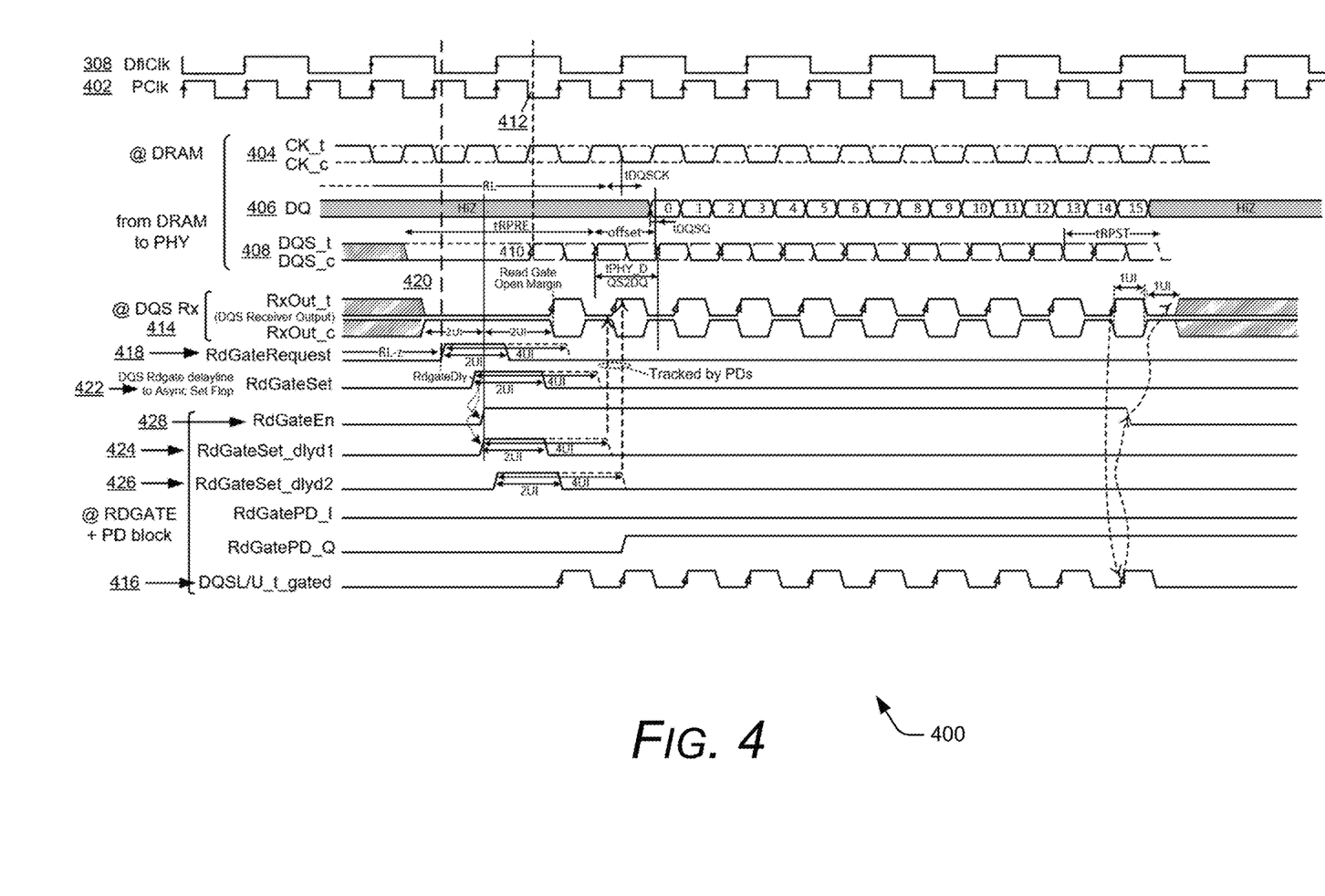
FIG. 4 depicts a non-limiting example of a circuit timing diagram for read gate training and tracking, as described herein.

FIG. 4 depicts a non-limiting example of a circuit timing diagram 400 for read gate training and tracking, as described herein. This example circuit timing diagram 400 illustrates operation of the training logic 216 to generate a pulse width filter signal to filter the high impedance state of the returned data strobe 214, which is returned from the physical memory out-of-phase with respect to the PHY clock 304 (e.g., PClk 402). The PHY 108 is operated according to the DfiClk 308 and the PClk 402. The signals 404 CK (e.g., CK_t and CK_c) are communicated from the PHY 108 to the DRAM 112. However, the phase relationship of the returned signaling data (DQ) 406 and data strobe (DQS) 408 (e.g., DQS_t and DQS_c (truth and complement differential strobe)) is no longer valid with respect to the internal PHY 108 clocking (e.g., DfiClk 308 and the PClk 402). Notably, the clocking edge of DQS at 410 does not align with the internal PHY clocking 402, which is shown offset at 412.

The DRAM 112 provides the strobe pattern (DQS), which can include assumptions for this example of the dficlk to pclk frequency ratio=1:2; the tRPRE=3*tCK (000010 pattern)=3*Pclk; the tRPST=1.5*tCK (010 pattern)=1.5*Pclk; and the Read DQS Offset=1*tCK.

The training logic 216 filters the signal 414 (e.g., as a filter or mask) with the toggling edges passing through and filter out the unknown data or high impedance state to generate the filtered signal 416 (e.g., DQSL/U_t_gated). The signal 414 "@DQS RX" is a signal being filtered. The training logic 216 initiates the signal 418 (e.g., RdGateRequest) from the state machine, and the edge line 420 is derived from the PClk 402 as the only known timing aspect (e.g., only issued on the PClk 402 rising interval). At the edge line 420, the pulse is configured and issued as a two-cycle pulse based on sub-granularity within the PHY clocking (e.g., one PClk is 2UI). The signal 418 goes into an adjustable delay line, which produces a delay signal 422 (e.g., RdGateSet) and further delay version of signals 424 and 426 (e.g., RdGateSet_dlyd1 and RdGateSet_dlyd2) for edge detection and determining the assertion time of a read gate enable signal 428 (e.g., RdGateEn). The phase detectors of the phase detectors circuit 222 can then be utilized to detect the falling edge of the signal 424 and signal 426 with respect to the rising edge of the signal 414, as shown by the edge line 420. A first phase detector clocked by signal 424 detects the level low of the rising edge of the signal 414, and a second phase detector clocked by signal 426 detects the level high of the rising edge of the signal 414. The rising edge of the read gate enable signal 428 (RdGateEn) is determined based on the detection edge alignment. This is the training logic 216 determining a timing mask as the enable signal 428 to filter the high impedance state of the returned data strobe with respect to the PHY clock.

In further aspects of the described techniques, the enable signal 428 determined by the training logic is configurable with extended pulses to filter the high impedance state, and the enable signal is self-closing (e.g., by the set/resettable flop). The set/resettable flop is not clocked by the PClk 402, but rather by the filtered signal 416 (e.g., DQSL/U_t_gated). In implementations, this is a credit system that allocates input signal assertion to the flop (nine credit or nine cycles of input high in this example) before the signal de-assertion goes low, and self-closing is initiated.

Additionally, the tracking logic 218 utilizes the phase detectors circuit 222 for signal edge detection to detect possible signal drift of the signal 414 relative signal 428 that has been determined by the training logic 216. In aspects of the described techniques, the tracking logic 218 is implemented to detect an advancing signal drift, and at least one of the tracking logic or the training logic then decrements the signal 422, which consequently decrements the enable signal 428. Similarly, the tracking logic is implemented to detect a lagging signal drift, and at least one of the tracking logic or the training logic then increments the signal 419, which consequently increments the enable signal 428. Accordingly, the unknown clocking phase of a returned data strobe from the physical memory is determined (e.g., by the training logic), and the determined clocking phase is maintained by monitoring and compensating for signal drift (e.g., by the tracking logic), which ensures that performance is not being degraded by the VT variation.

In further aspects of the described read gate training and tracking, the tracking logic 218 is initiated to track the signal drift of a returned data strobe with respect to a delay signal, and the training logic 216 is initiated during the return data signals that are communicated back from the memory system to determine the timing mask that filters the high impedance state of the returned data strobe. Accordingly, operational performance of the memory operations between the PHY and the physical memory is maintained by the tracking logic being initiated during a memory read operation, and by the tracking logic and the training logic being initiated during a return data signal communicated from the memory system.

Figure 5:
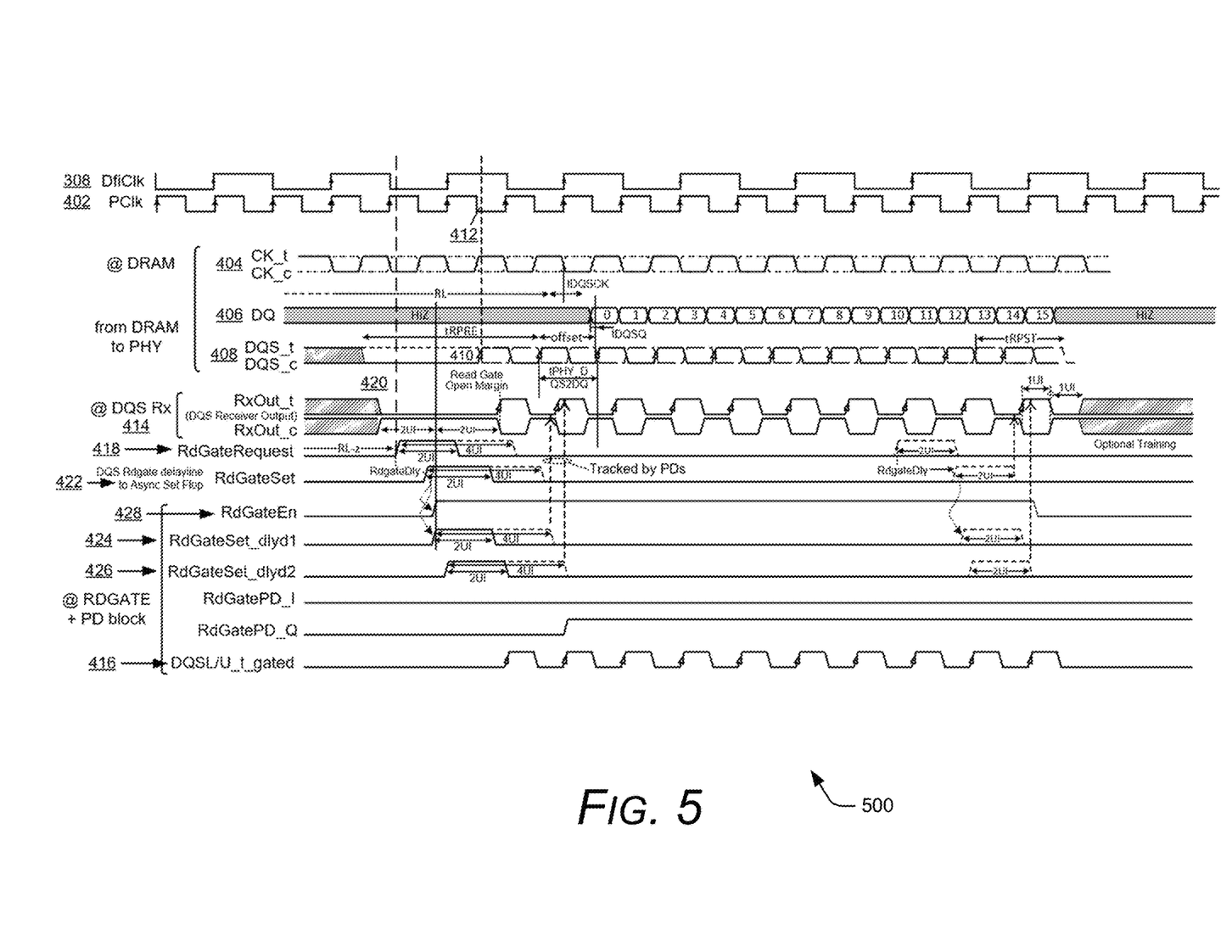
FIG. 5 depicts a non-limiting example of the circuit timing diagram for read gate training and tracking, as described herein.

FIG. 5 depicts a non-limiting example of the circuit timing diagram 500 for read gate training and tracking, as described herein. In this example, the circuit timing diagram 500 is the circuit timing diagram 400 with training implemented from the right side of the graph for the circuit timing, as indicated by the additional dashed signal pulses.

Figure 6:
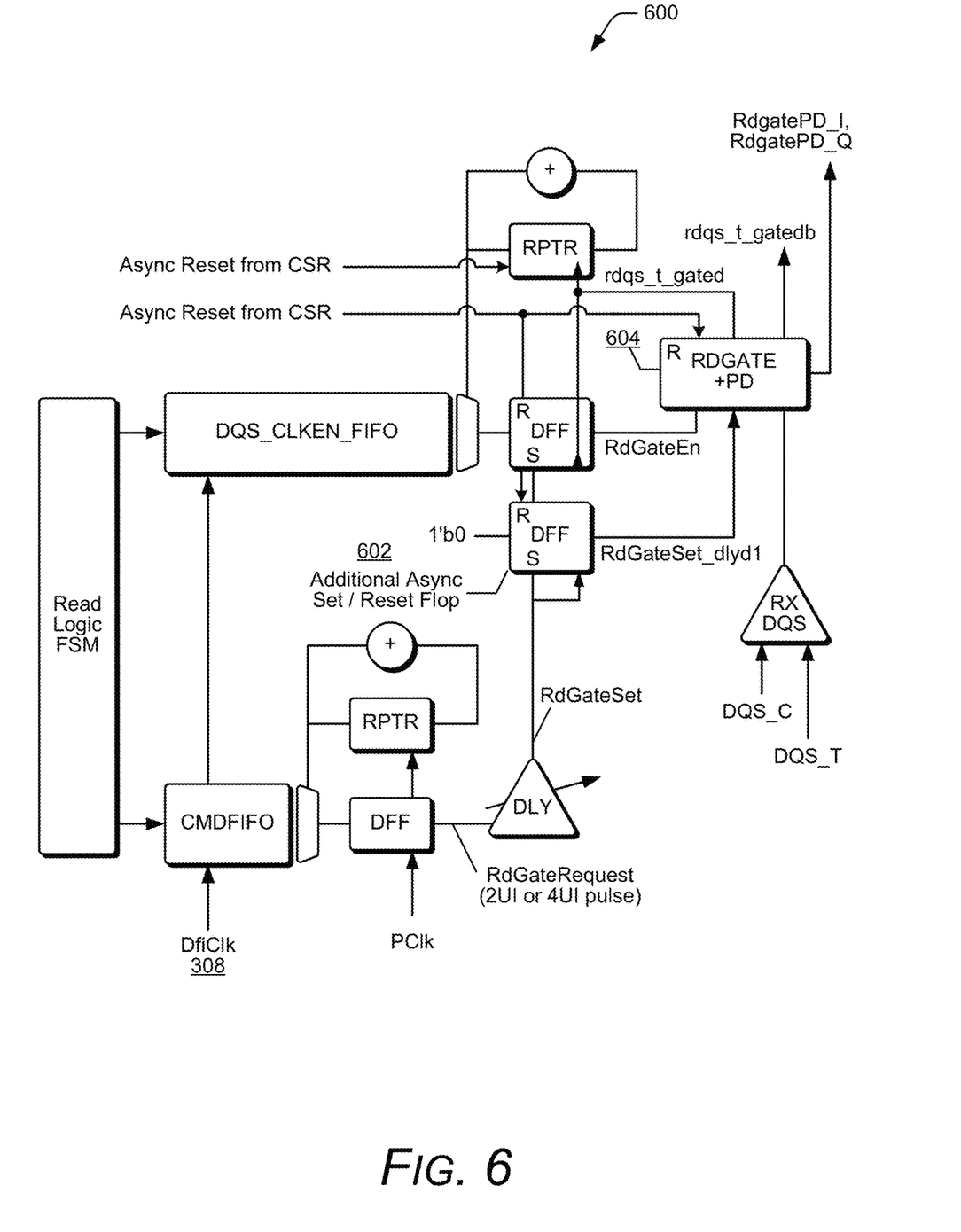
FIG. 6 depicts a non-limiting example of a read gate training and tracking circuit diagram as related to read gate training and tracking, as described herein.

FIG. 6 depicts a non-limiting example of a read gate training and tracking circuit diagram 600 as related to read gate training and tracking, as described herein. This example circuit diagram 600 illustrates an implementation of the read gate (RDGATE) logic 120 in the PHY 108. In an implementation, an additional async set/reset flop (at 602) is utilized for replicating Set to Q delay (i.e., Set to Q delay on these two FFs match). The FF (at 602) has the clock also coming from RdGteSet, and when set, the output is not sticky. The component 604 (e.g., RDGATE+PD) is representative of the phase detectors circuit 222 and the clock gate, which is further shown and described with reference to FIG. 7.

Figure 7:
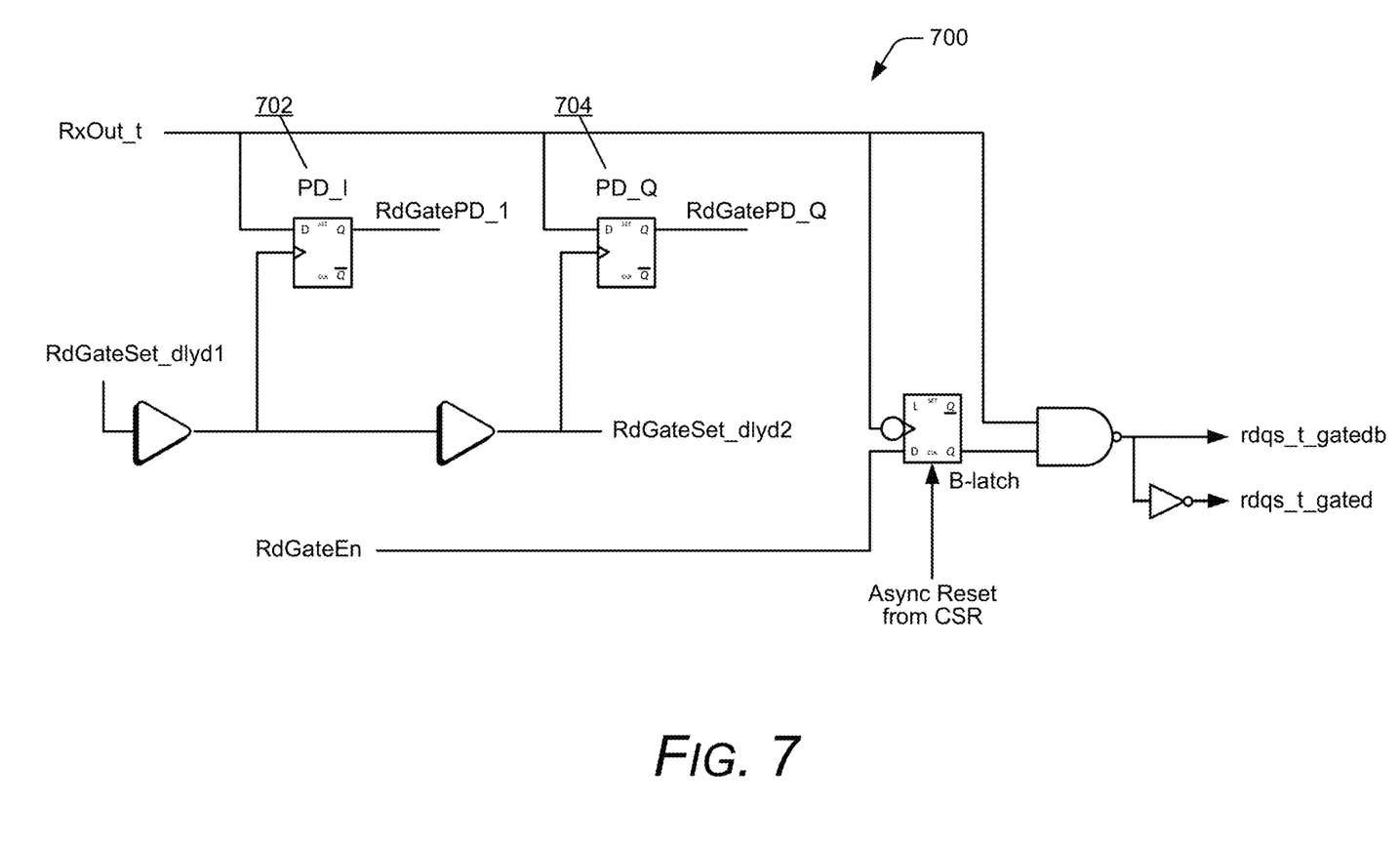
FIG. 7 depicts a non-limiting example of a circuit diagram for phase detectors logic as related to read gate training and tracking, as described herein.

FIG. 7 depicts a non-limiting example of a circuit diagram 700 for phase detectors logic and the clock gate as related to read gate training and tracking, as described herein. In this example circuit diagram 700, the phase detectors circuit 222 includes a first phase detector 702 and at least a second phase detector 704, which implement edge detection as utilized by the training logic 216 and the tracking logic 218. In aspects of the techniques for read gate training and tracking, as described herein, the training logic 216 utilizes edge detection (e.g., the phase detectors circuit 222) to determine the unknown clocking phase of the returned data strobe 214 with respect to the PHY clock. The tracking logic 218 utilizes the edge detection (e.g., phase detectors circuit 222) to detect a signal drift of the returned data strobe with respect to the delay signal, such as an advancing signal drift of the delay signal or a lagging signal drift of the delay signal.

Figure 8:
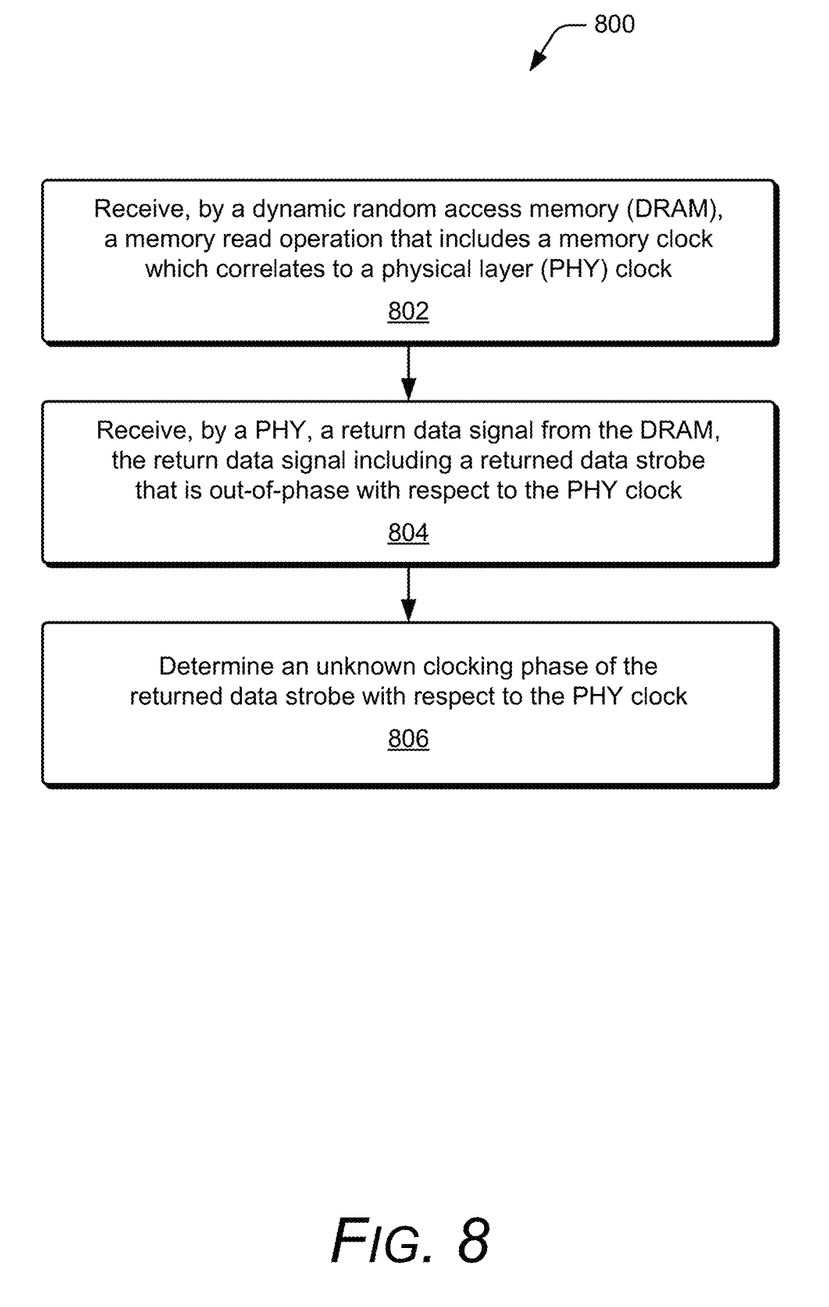
FIGS. 8 and 9 depict procedures in example implementations of read gate training and tracking, as described herein.

FIG. 8 is a flow diagram depicting a procedure 800 in an example implementation of read gate training and tracking, as described herein. The order in which the procedure is described is not intended to be construed as a limitation, and any number or combination of the described operations are performed in any order to perform the procedure, or an alternate procedure.

In the procedure 800, a memory read operation is received, where the memory read operation includes a memory clock that correlates to a physical layer (PHY) clock (at 802). For example, the physical memory 110 (e.g., a dynamic random access memory (DRAM)) receives the memory read operation 202, and the memory read operation includes the memory clock 208 that correlates to the physical layer (PHY) clock 210.

A return data signal is received by a PHY from the memory system, where the return data signal includes a returned data strobe that is out-of-phase with respect to the PHY clock (at 804). For example, the PHY 108 receives the return data signal 212 from the memory system (e.g., the physical memory 110), and the return data signal includes the returned data strobe 214 that is out-of-phase with respect to the PHY clock 210.

An unknown clocking phase of the returned data strobe is determined with respect to the PHY clock (at 806). For example, the training logic 216 determines the unknown clocking phase of the returned data strobe 214 with respect to the PHY clock 210.

Figure 9:
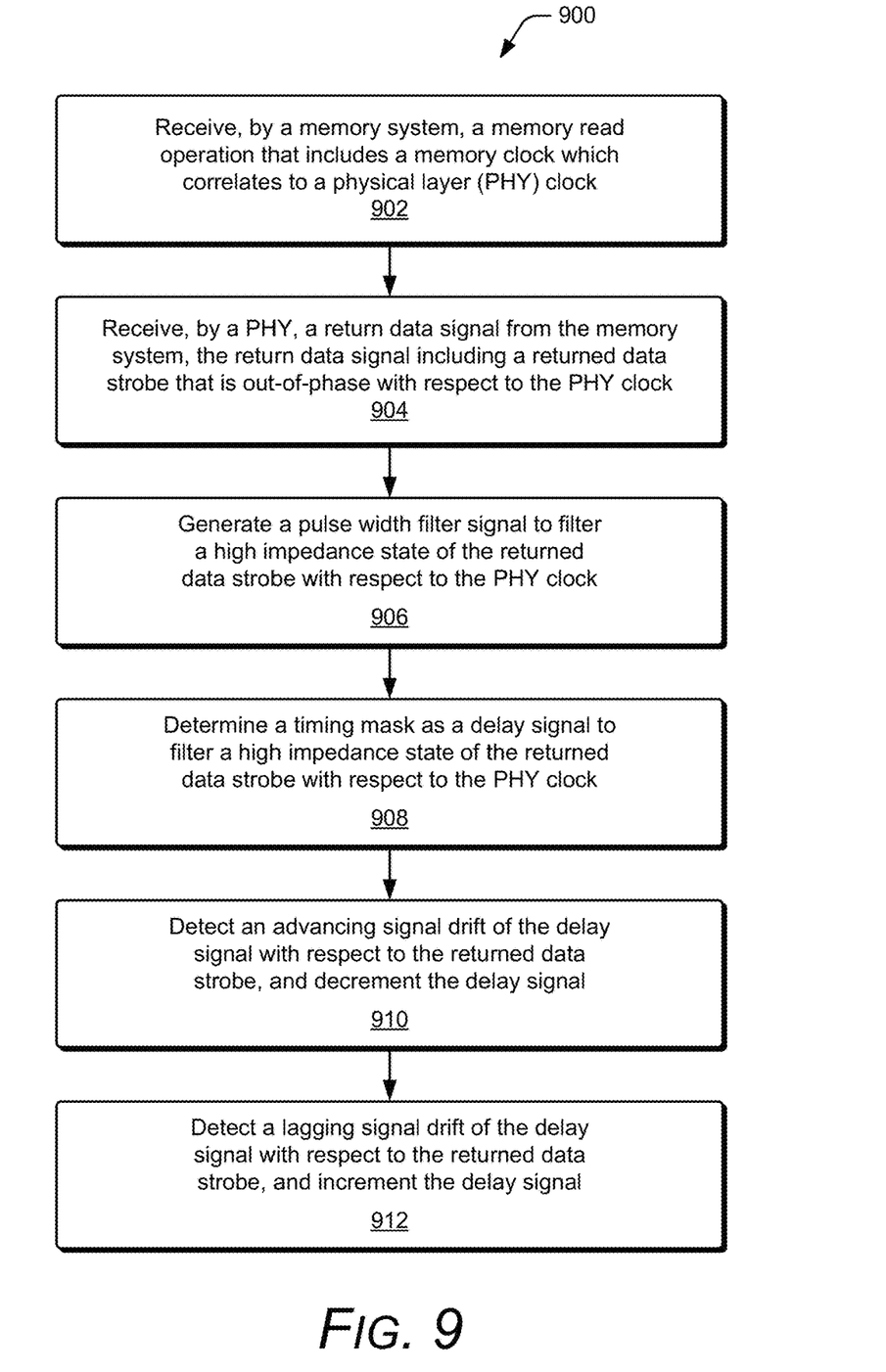

FIG. 9 is a flow diagram depicting a procedure 900 in an example implementation of read gate training and tracking, as described herein. The order in which the procedure is described is not intended to be construed as a limitation, and any number or combination of the described operations are performed in any order to perform the procedure, or an alternate procedure.

In the procedure 900, a memory read operation is received, where the memory read operation includes a memory clock that correlates to a physical layer (PHY) clock (at 902). For example, the physical memory 110 (e.g., a dynamic random access memory (DRAM)) receives the memory read operation 202, and the memory read operation includes the memory clock 208 that correlates to the physical layer (PHY) clock 210.

A return data signal is received by a PHY from the memory system, where the return data signal includes a returned data strobe that is out-of-phase with respect to the PHY clock (at 904). For example, the PHY 108 receives the return data signal 212 from the memory system (e.g., the physical memory 110), and the return data signal includes the returned data strobe 214 that is out-of-phase with respect to the PHY clock 210.

A pulse width filter signal is generated to filter a high impedance state of the returned data strobe with respect to the PHY clock (at 906). For example, the training logic 216 generates the pulse width filter signal to filter a high impedance state of the returned data strobe 214 with respect to the PHY clock 210.

A timing mask as a delay signal is determined to filter a high impedance state of the returned data strobe with respect to the PHY clock (at 908). For example, the training logic 216 determines the timing mask of the delay signal to filter a high impedance state of the returned data strobe 214 with respect to the PHY clock 210.

An advancing signal drift of the delay signal with respect to the returned data strobe is detected, and the delay signal is decremented (at 910). For example, the tracking logic 218 detects an advancing signal drift of the delay signal with respect to the returned data strobe, and the training logic 216 decrements the delay signal.

A lagging signal drift of the delay signal with respect to the returned data strobe is detected, and the delay signal is incremented (at 912). For example, the tracking logic 218 detects a lagging signal drift of the delay signal with respect to the returned data strobe, and the training logic 216 increments the delay signal.

The various functional units illustrated in the figures and/or described herein (including, where appropriate, the processing unit 104, the memory controller 106, the PHY 108, the physical memory 110 (e.g., to include the DRAM 112), and the read gate logic 120 are implemented in any of a variety of different forms, such as in hardware circuitry, software, and/or firmware executing on a programmable processor, or any combination thereof. The procedures provided are implementable in any of a variety of devices, such as a general-purpose computer, a processor, a processor core, and/or an in-memory processor. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a dynamic random access memory (DRAM), a register, cache memory, semiconductor memory devices, magnetic media such as internal hard disks and removable disks, magneto-optical media, and optical media such as CD-ROM disks, and digital versatile disks (DVDs).

Although implementations of read gate training and tracking have been described in language specific to features, elements, and/or procedures, the appended claims are not necessarily limited to the specific features, elements, or procedures described. Rather, the specific features, elements, and/or procedures are disclosed as example implementations of read gate training and tracking, and other equivalent features, elements, and procedures are intended to be within the scope of the appended claims. Further, various different examples are described herein and it is to be appreciated that many variations are possible and each described example is implementable independently or in connection with one or more other described examples.

What is claimed is:

1. A computing device, comprising:
a PHY configured to:
communicate, to a memory system, a memory read operation that includes a memory clock which correlates to a physical layer (PHY) clock;
receive a return data signal from the memory system, the return data signal including a returned data strobe that is out-of-phase with respect to the PHY clock; and
filter, using edge detection and delay adjustment, a high impedance state of the returned data strobe with respect to the PHY clock.

2. The computing device of claim 1, wherein the PHY includes a phase detectors circuit implementing the edge detection.

3. The computing device of claim 1, wherein the PHY is further configured to generate a pulse width filter signal to filter the high impedance state of the returned data strobe with respect to the PHY clock.

4. The computing device of claim 1, wherein the PHY is further configured to generate a timing mask as a delay signal to filter the high impedance state of the returned data strobe with respect to the PHY clock.

5. The computing device of claim 4, wherein the delay signal is configurable with extended pulses to filter the high impedance state, and the delay signal is self-closing.

6. The computing device of claim 4, wherein the PHY is further configured to detect, utilize using the edge detection, a signal drift of the delay signal with respect to the returned data strobe.

7. The computing device of claim 6, wherein the PHY is further configured to decrement the delay signal in response to detecting an advancing signal drift of the delay signal with respect to the returned data strobe.

8. The computing device of claim 6, wherein the PHY is further configured to increment the delay signal in response to detecting a lagging signal drift of the delay signal with respect to the returned data strobe.

9. The computing device of claim 6, wherein the PHY is configured to:
track the signal drift of the delay signal with respect to the returned data strobe during the return data signal being communicated to the memory system; and
generate the timing mask that filters the high impedance state of the returned data strobe with respect to the PHY clock during the return data signal being communicated from the memory system.

10. The computing device of claim 9, wherein operational performance of memory operations between the PHY and the memory system is maintained based on read gate training and tracking being initiated during the return data signal communicated from the memory system.

11. A device physical layer (PHY), configured to:
communicate, to a dynamic random access memory (DRAM), a memory read operation that includes a memory clock which correlates to a PHY clock;
receive a returned data strobe from the DRAM, the returned data strobe being out-of-phase with respect to the PHY clock; and
adjust a delay signal to compensate for signal drift of the delay signal with respect to the returned data strobe.

12. The device PHY of claim 11, wherein the device PHY is further configured to generate a pulse width filter signal to filter a high impedance state of the returned data strobe with respect to the PHY clock.

13. The device PHY of claim 11, wherein the device PHY is further configured to generate a timing mask as the delay signal to filter a high impedance state of the returned data strobe with respect to the PHY clock.

14. The device PHY of claim 13, wherein the device PHY is further configured to:
- decrement the delay signal in response to detecting an advancing signal drift of the delay signal with respect to the returned data strobe; or
- increment the delay signal in response to detecting a lagging signal drift of the delay signal with respect to the returned data strobe.

15. A method, comprising:
- communicating, to a dynamic random access memory (DRAM), a memory read operation that includes a memory clock which correlates to a physical layer (PHY) clock;
- receiving a return data signal from the DRAM, the return data signal including a returned data strobe that is out-of-phase with respect to the PHY clock; and
- filtering a high impedance state of the returned data strobe with respect to the PHY clock.

16. The method of claim 15, further comprising:
generating a pulse width filter signal to filter the high impedance state of the returned data strobe with respect to the PHY clock.

17. The method of claim 15, further comprising:
generating a timing mask as a delay signal to filter a high impedance state of the returned data strobe with respect to the PHY clock.

18. The method of claim 17, further comprising:
utilizing edge detection to detect a signal drift of the delay signal with respect to the returned data strobe.

19. The method of claim 17, further comprising:
detecting an advancing signal drift of the delay signal with respect to the returned data strobe; and
decrementing the delay signal.

20. The method of claim 17, further comprising:
detecting a lagging signal drift of the delay signal with respect to the returned data strobe; and
incrementing the delay signal.

* * * * *